(No Model.) 6 Sheets—Sheet 1.
J. H. GREENLEAF.
CASH REGISTER AND INDICATOR.
No. 505,101. Patented Sept. 19, 1893.
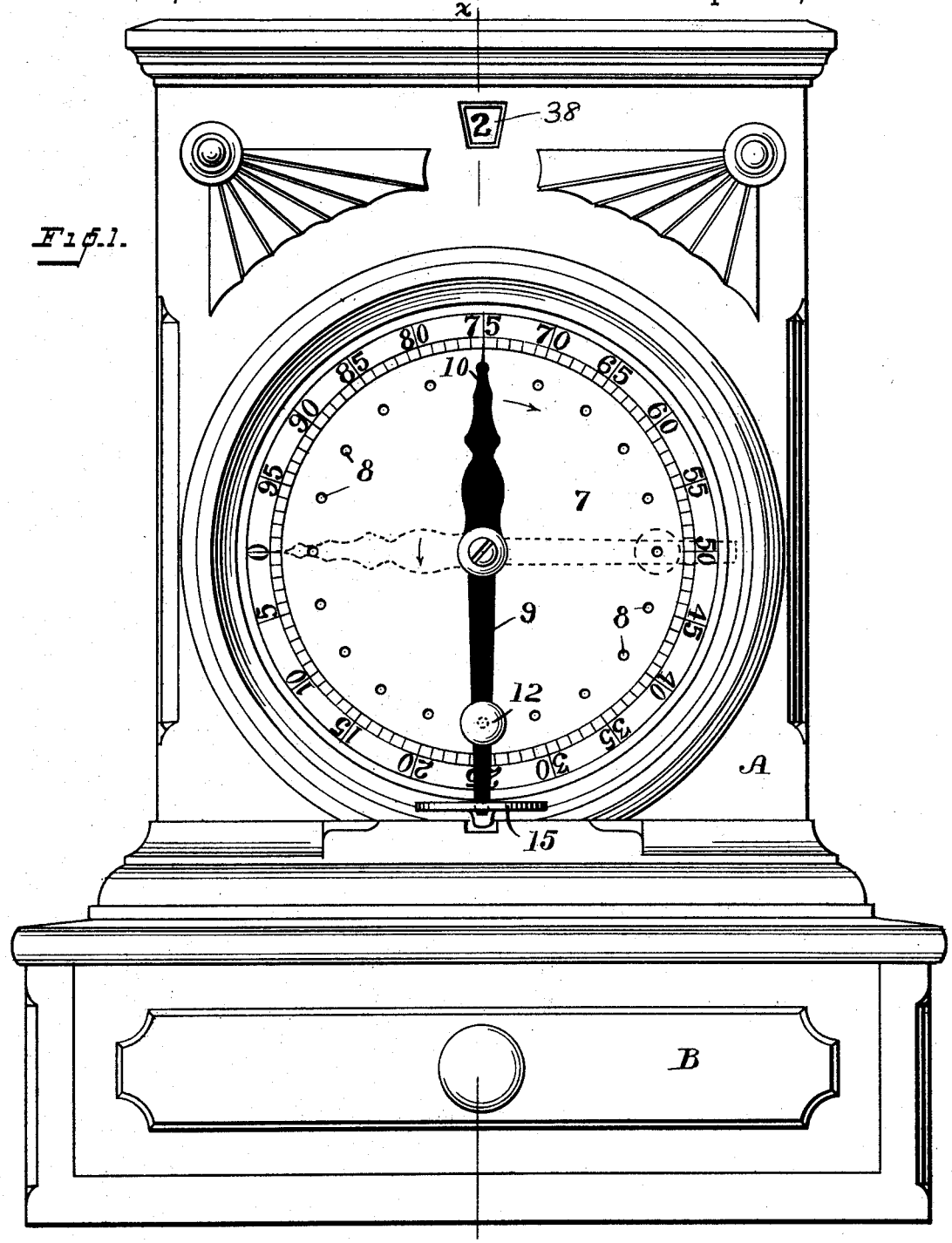
WITNESSES
C. M. Newman
A. J. Tanner
INVENTOR
Joseph H. Greenleaf
by his atty,
D. H. Hubbard

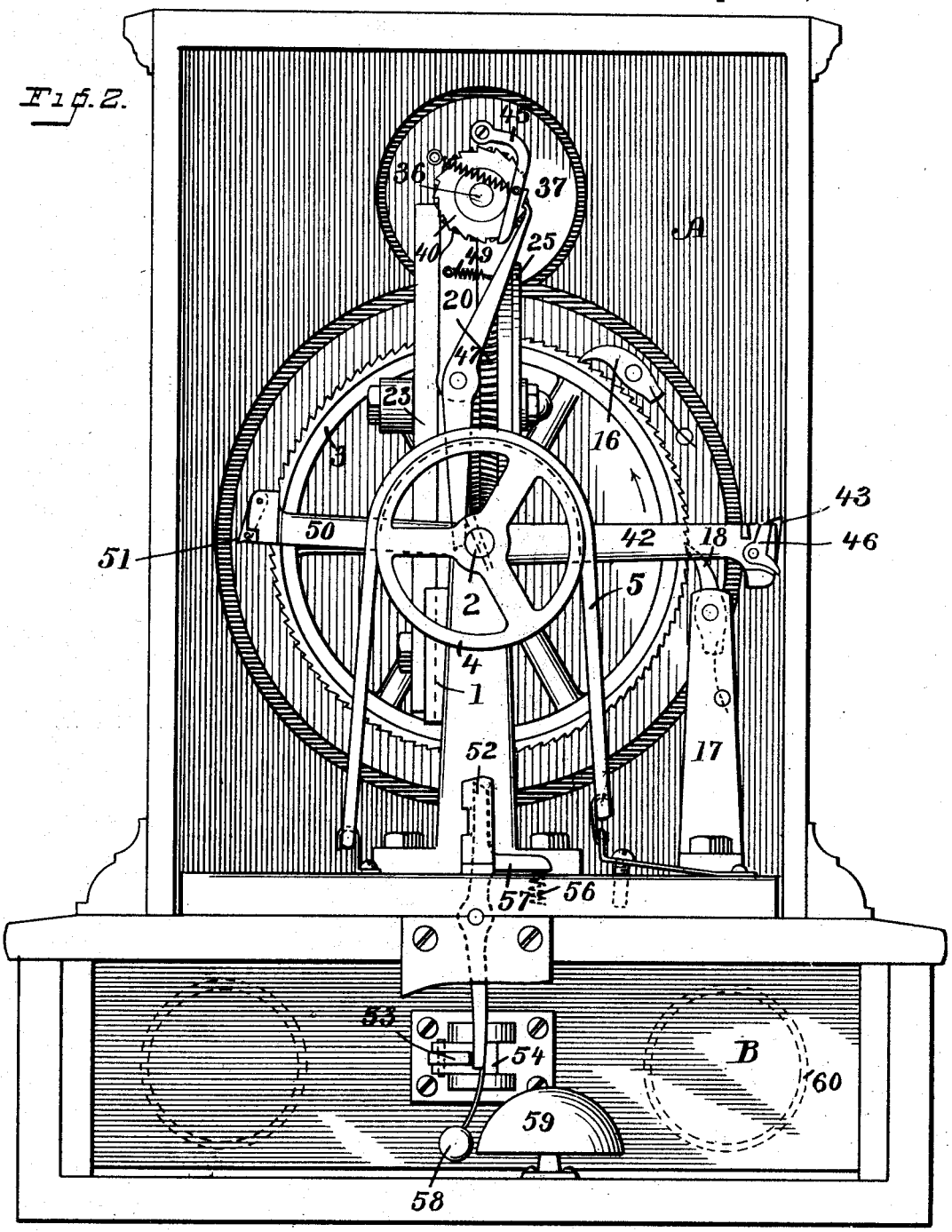

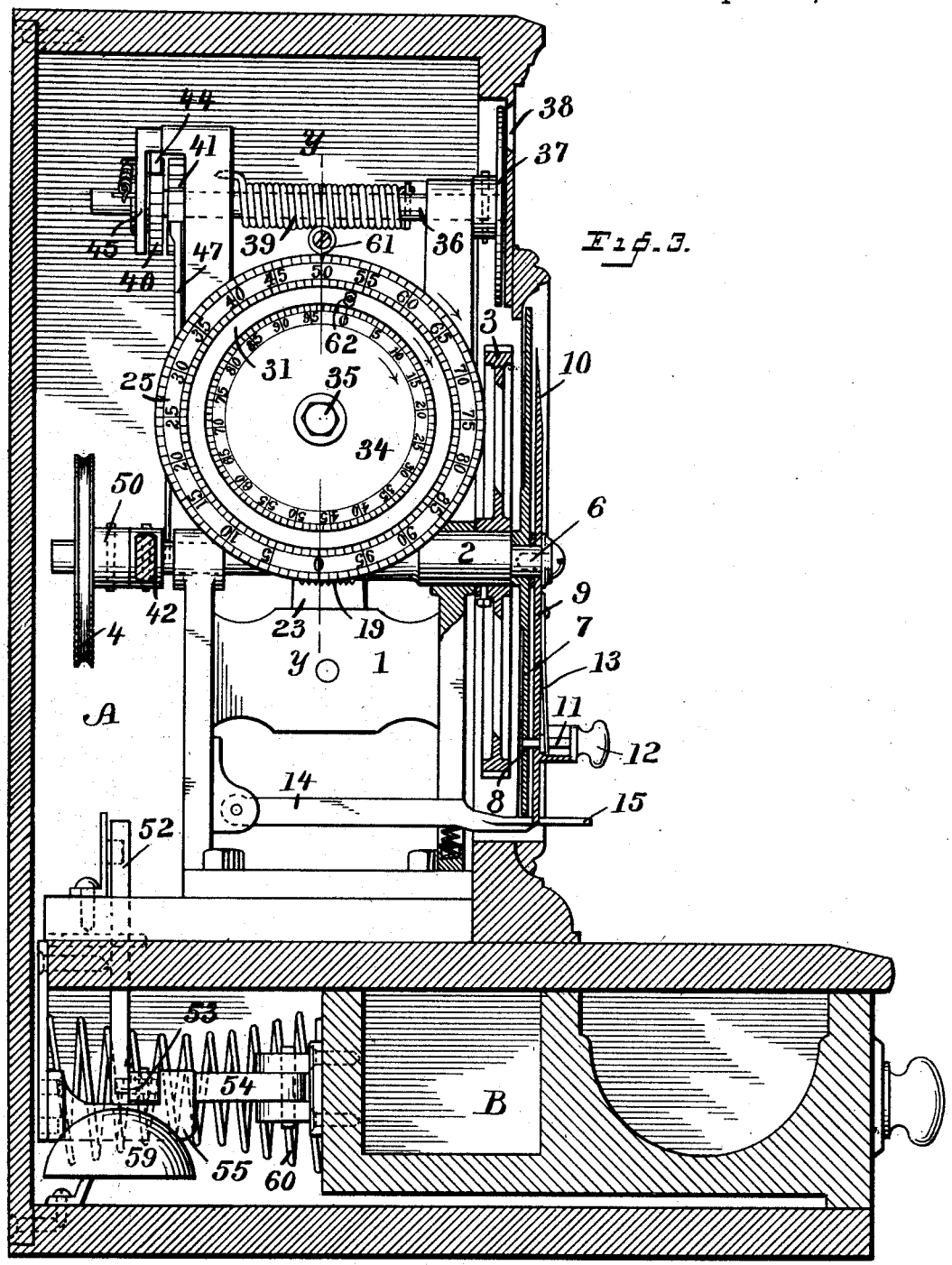

(No Model.)  6 Sheets—Sheet 4.

J. H. GREENLEAF.
CASH REGISTER AND INDICATOR.

No. 505,101.  Patented Sept. 19, 1893.

WITNESSES
C. M. Newman
A. J. Tanner

INVENTOR
Joseph H. Greenleaf
by his atty
J. H. Hubbard

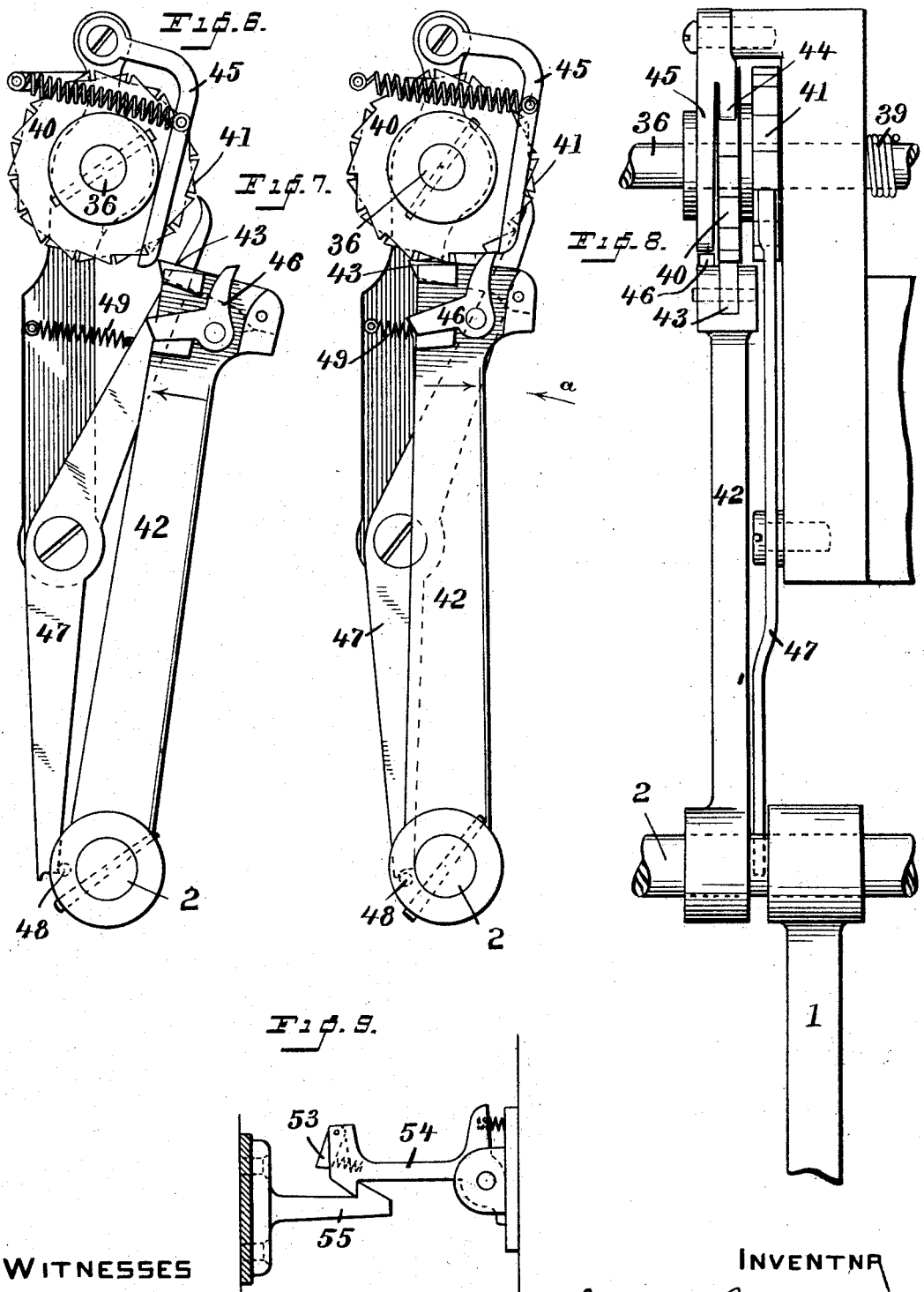

(No Model.) 6 Sheets—Sheet 6.
J. H. GREENLEAF.
CASH REGISTER AND INDICATOR.
No. 505,101. Patented Sept. 19, 1893.
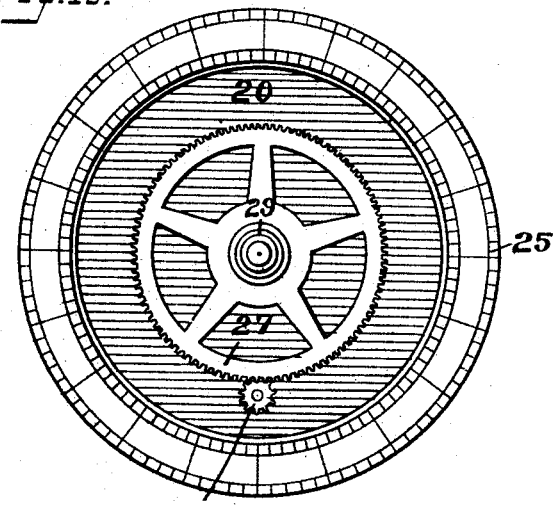
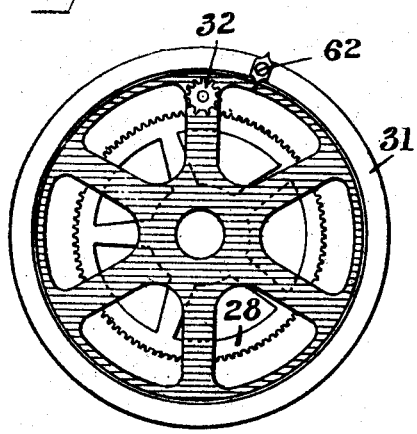
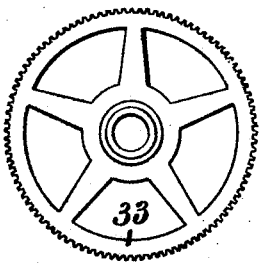
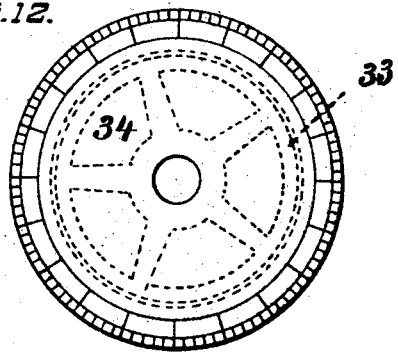
WITNESSES
C. M. Newman
A. J. Tanner
INVENTOR
Joseph H. Greenleaf
by his atty
D. H. Hubbard

UNITED STATES PATENT OFFICE.

JOSEPH H. GREENLEAF, OF NEW HAVEN, CONNECTICUT.

CASH REGISTER AND INDICATOR.

SPECIFICATION forming part of Letters Patent No. 505,101, dated September 19, 1893.

Application filed December 14, 1891. Serial No. 414,914. (No model.)

*To all whom it may concern:*

Be it known that I, JOSEPH H. GREENLEAF, a citizen of the United States, residing at New Haven, in the county of New Haven and State of Connecticut, have invented certain new and useful Improvements in Cash Indicators and Registers; and I do hereby declare the following to be a full, clear, and exact description of the invention, such as will enable others skilled in the art to which it appertains to make and use the same.

This invention relates to certain novel and useful improvements in cash indicators and registers, and has for its object to provide a machine of this character which shall be simple and economical in its construction, which shall indicate the amount of each sale, and which shall totalize all sales made by means of mechanism inaccessible to the operator, and with these ends in view my invention consists and resides in the construction and combination of elements hereinafter fully and in detail explained and then recited in the claims.

In order that such as are skilled in the art to which my invention appertains may fully understand its construction and method of operation, I will proceed to describe the same in detail, reference being had to the accompanying drawings which form a part of this specification, and in which—

Figure 5:
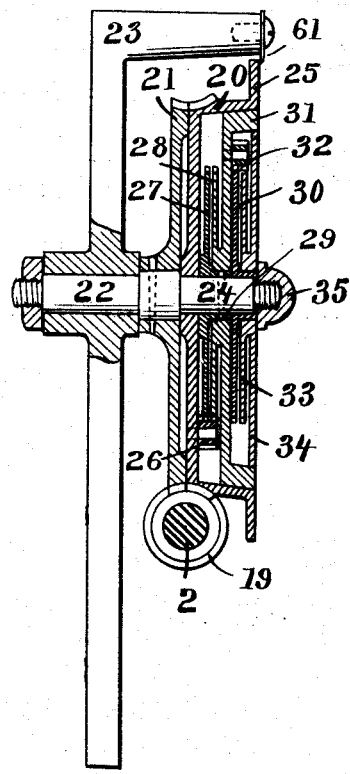
Figure 4:
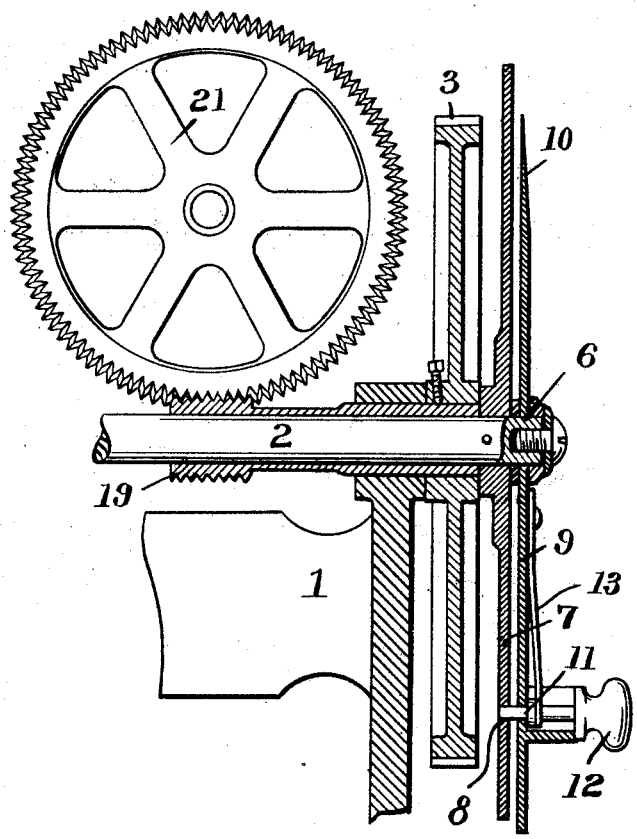

Figure 1, is a front elevation; Fig. 2, a rear elevation, the back of the case being removed. Fig. 3, is a vertical section at the line $x$—$x$ of Fig. 1. Fig. 4, is a detail section of the parts shown at the central right hand of Fig. 3, the dials being removed. Fig. 5, is a section at the line $y$—$y$ of Fig. 3. Fig. 6, is a detail rear elevation of the mechanism whereby the transfer from the cents indicating device to the dollars indicating device is effected. Fig. 7, is a similar view showing the parts in another position; Fig. 8, an edge elevation of the parts shown at Fig. 7, looking in the direction of the arrow $a$. Fig. 9, is a detail plan view of the drawer latching mechanism. Fig. 10, is a front elevation of the outer dial and the gear and pinion with the same, the central dials being removed; Fig. 11, a similar elevation with the inner and outer dials removed; Fig. 12, a detail front elevation of the outer dial, the gear within being shown in dotted lines; Fig. 13, an elevation of one of the gears having 101 teeth.

Like numerals and letters of reference denote the same parts in each of the figures.

A is the inclosing case which may be made of metal or wood according to circumstances, and B is a cash drawer or till which is suitably accommodated in the bottom of the case.

Within the case and mounted above the drawer is an H-shaped iron frame 1 whose general form is shown at Fig. 3. Mounted in this frame and extending through the machine from front to rear is the main shaft 2 bearing near its outer end a ratchet wheel 3 having one hundred teeth. This wheel is rigidly secured to a sleeve loosely mounted upon the shaft 2, which sleeve terminates in a worm 19 (see Fig. 4) the function of which will be hereinafter explained. Near its other end the main shaft bears a grooved pulley 4 over which, as is clearly shown at Fig. 2, runs a spring-retained friction band 5. The outer extremity of said shaft, as shown at 6 at the right of Fig. 3, is shouldered, and upon this shouldered portion is fixedly secured a dial 7 which appears at Fig. 1, and whose face is divided into one hundred parts in order that, by the means presently to be described, various amounts up to one dollar may be indicated. If the machine is designed to indicate and register odd amounts in cents the face of the dial will be pierced with one hundred holes 8. The machine shown, however, is provided only with one hole for every five units, and will therefore operate only in multiples of 5. Outside the dial and pivoted upon the diminished end of the main shaft is a pointer 9 extending entirely across the dial. One end, as at 10, forms a hand, and the other end, as shown at Fig. 3, is provided with a plunger or pin 11 whose outer end has a knob 12, and whose point is adapted to engage with either of the holes 8. A spring 13 fastened to the pointer normally impels the plunger inward into engagement, as shown at Fig. 3, but said plunger may be readily withdrawn by hand out of engagement with the dial so that the pointer may turn freely. Beneath this pointer is a spring-actuated latch 14 whose inner end is pivoted to the frame, and whose outer end is broadened to form a finger plate 15 having a hole therein for the engagement of the lower end of the pointer. Upon its inner face the dial 7 bears a pawl 16 whose nose is spring-actuated against the ratchet wheel 3 and is constantly engaged therewith, see Fig. 2. The function of this pawl, as will presently be explained, is to permit the dial to carry the ratchet around with it in one direction. When the dial is moved in the other direction, however, the pawl slips backward over its teeth, and any retrograde movement of the ratchet wheel is prevented by a retaining pawl 18 mounted on a small post 17 within the case, and which in turn slips over the teeth when the wheel moves forward.

Near its center the main shaft bears a worm 19 shown at Figs. 3 and 4, and this worm engages two other worm gears 20 and 21. The gear 21 is secured upon and revolves a short horizontal shaft 22 which has a bearing on an upwardly extended bracket 23 within the case said shaft 22 being at right angles to the main shaft 2, as shown in Fig. 3. The outer end of the shaft 22 is shouldered, as seen at 24, and upon this shouldered portion the gear 20 is loosely journaled. The said gear 20 has formed thereon or secured thereto an annular dial 25, as clearly appears at Figs. 3, 5 and 10. The two gears 20 and 21 are provided, the one with one hundred teeth and the other with one hundred and one. Upon its outer face the gear wheel 20 carries a short stud upon which is journaled a pinion 26 which pinion meshes into two gears 27 and 28. The gear 27 has one hundred teeth and is secured to or formed upon a sleeve 29, which in its turn is attached to and revolves with the shaft 24. Said sleeve also has formed or secured thereon a gear 30 having one hundred and one teeth. The gear 28 just referred to as having one hundred and one teeth, is secured to and drives a dial 31, which with said gear is journaled about the sleeve 29 and freely revolves thereon. This dial in its turn bears a short stud about which is journaled a small pinion 32. This pinion meshes into the gear 30 heretofore described as having one hundred and one teeth, and mounted on the shaft 29, and also into a gear 33 having one hundred teeth. The gear 33 has secured thereon a flat disk-shaped dial-plate 34. All the parts just described are secured in proper operative combination by means of a head or cap 35 screw-threaded upon the end of the diminished end of the shaft 22. These several gear wheels and dials form the totalizing mechanism of the register, and their method of operation will be hereinafter fully explained.

The large outside dial 7 forms the indicating device up to one hundred units or one dollar, but in order to indicate sums larger than one dollar I have provided a supplemental indicating mechanism which I will now describe, referring more particularly to Figs. 2, 3, 6, 7, and 8.

Directly above the main shaft and journaled in extensions of the frame is a shaft 36 upon whose outer end is borne a disk 37 having arranged upon its face numerals from 1 up to any desired number, say 10 or 15. In the case A in front of this disk is an opening 38 through which one of the numbers may be seen.

Around the shaft 36 is coiled a spiral spring 39, one end connected to said shaft, and the other to the frame, as appears at Fig. 3. Near its inner end the shaft bears two ratchet wheels 40 and 41 having their teeth oppositely inclined and both fast on the shaft. In number the teeth are equal to the number of figures on disk 37.

Secured upon the shaft 2, see Figs. 2, 7 and 8, is an arm 42 whose normal position when the machine is at rest is substantially as shown at Figs. 7 and 8. The upper end of this arm bears a spring pawl 43 which is normally held by its spring in the position shown at Fig. 6, namely so that in passing beneath the ratchet wheel 40 it will engage a tooth upon said wheel and turn it one step, but when passing said wheel in the direction shown by the arrow on Fig. 7 it will be depressed.

The ratchet wheel 40 is provided with a retaining pawl 44 carried upon a curved and spring-actuated lever 45 fulcrumed to the frame. After the ratchet wheel 40 has been advanced a step by the pawl 43 the spiral spring 39 will tend to turn it back, and the function of the pawl 44 is to prevent such return. The arm 42 is, however, provided with another pawl 46 which, as the arm passes under the lever 45 in the direction shown by the arrow on Fig. 6, will be depressed and pass under said lever. When, however, the arm is moved backwardly or in the direction shown by the arrow on Fig. 7, the pawl 46 will engage the lever and thereby disengage the pawl 44 from the ratchet wheel 40. The arm 42, when traveling forward, as shown at Fig. 6, is prevented from moving the ratchet wheel 40 and the shaft 36 more than one step at a time by means of a lever pawl 47 which is fulcrumed at its center to the frame. The nose of this pawl is normally engaged with the ratchet wheel 41, but once at each revolution of the shaft 2 it is moved out of such engagement for a short time by a pin 48, which latter projects from a collar on the shaft 2, and as it passes under the lever tilts the latter upon its fulcrum. This movement of the lever occurs just at the moment when the pawl 43 is about to engage a tooth on the ratchet wheel 40, and the release of the lever 47 and its return by the spring 49 takes place just before the full movement of one tooth, which the pawl 43 effects has taken place.

The main shaft 2 carries also another arm 50 oppositely extended from the arm 42 and provided with a spring-actuated pawl 51. See Fig. 3. This pawl normally lies close to the end of a lever 52 which controls the drawer latch, and whenever any forward movement of the main shaft takes place the arm 50 swings past the lever 52 and the pawl opens the drawer by tilting the lever, which in turn by engagement with a spring pawl 53 on a pivoted and spring-actuated latch-hook 54 disengages the latter from a stationary hook 55 secured to the back of the case. The lever 52 is returned to its normal position after the passage of the pawl 51 by means of a spring 56 acting against a short horizontal arm 57 upon the lever 52. The lower end of the lever 52 bears a bell hammer 58 which, as the lever is returned by its spring, strikes a bell 59 secured in the bottom of the case. When the drawer is released it is projected out of its compartment to a greater or less extent by means of springs 60 secured to the back of the case and engaging the rear of the drawer.

The operation of my invention is as follows: Suppose a sale to have been made requiring the indication and registry of $2.75. The operator depresses the finger plate or key 15, thereby releasing the pointer therefrom, and at the same time he withdraws the pin 11 out of engagement with the dial. This leaves the pointer free to be turned in either direction, and it is then moved upon its axis until the end of the pointer is at 75, when the pin is permitted to set in the hole in the dial which is opposite the figures 75. This fastens the plate and dial together. The operator then, using the handle 12 as a crank, turns the dial to the right until the pointer stands as shown at Fig. 1, when the plate 15 locks it. This movement through the pawl 16 has turned the ratchet wheel 3 forward seventy-five teeth. Now to indicate and register the sum of two dollars in addition the operator again depresses the finger plate and turns the dial two complete revolutions, and this causes the numeral 2 on the disk 37 to appear at the opening 38 in the following manner. The first complete rotation of the dial causes the arm 42 to pass beneath the ratchet wheel 40 and thereby turn the latter and its shaft 36 one step, and the second complete rotation of the dial advances it another step, so that the numeral 2 appears and the shaft is detained as against return by the spring, through the engagement of the pawl 44 with the ratchet 40. The first movement of the dial in the forward direction causes the release of the drawer latch through the operation of the arm 50 and its pawl upon the lever 52, as heretofore explained, and this also strikes the bell 59.

Although the totalizing mechanism is operated simultaneously with the indicating devices, and although it is intended that the parts shall be left in the position shown in Fig. 1 so as to indicate the last sale until another sale is required to be made, I will explain the method of restoring the pointer and dial to their normal positions before explaining in detail the operation of the totalizing mechanism. To restore the pointer and dial the operator releases the pointer both from the plate 15 and from the dial and carries said pointer in either direction until it stands at 0, see dotted lines at Fig. 1. He then revolves the pointer and dial to the left until the pointer is arrested by the finger plate. Inasmuch as the dial 7 is fixed rigidly to the outer end of the shaft 2, and the ratchet wheel 3 is fixed to a sleeve which is loosely mounted upon the shaft 2, as clearly shown in Fig. 4, and as before described, the backward movement of the dial has no effect upon the ratchet wheel 3, over whose teeth the pawl 16 carried by the dial freely slides. This backward movement of the dial also carries the arm 42 which is fixed to the rear end of said shaft 2 backward to its normal position which is as shown at Fig. 7, with the pawl 43 not quite in engagement with the teeth on the ratchet wheel 40. It will be seen that the ratchet wheel 3 is only operative with the shaft 2 when the dial plate is moved to the right and the pawl 16 is in engagement with the teeth of the ratchet wheel 3. The backward movement of the arm 42, however, brings the pawl 46 into operative engagement with the lever 45, and by carrying the pawl 44 out of engagement with the ratchet wheel 40 permits the spiral spring to return the supplemental indicating disk to 0, where it is arrested by any suitable stop. As nothing but a full revolution of the main shaft and the arm 42 will actuate the shaft 36, the disk 37 remains at 0 during the indication and registry of all sums less than one dollar.

The totalizing mechanism is operated from the main shaft by means of the two gears 20 and 21 which the pinion 19 engages and drives. This totalizing mechanism belongs to the general class of registers, types of which are shown in the patent of Curtis, No. 125,179, April 2, 1872, but differs from other registers of this class in its construction. The gear 20, as heretofore explained, has connected thereto the dial 25, and as said gear has one hundred teeth, and as the pinion 19 is properly calculated for this purpose, each revolution of the outer dial 7 when connected with the ratchet wheel 3 will move the dial 25 one degree past the pointer 61, each degree representing one dollar. Through the pinion 26 which in its turn gears into the wheels 27 and 28, the latter having one hundred and one teeth, the annular dial 31 will be carried with the dial 25, but at the rate of one hundred and one steps to each one hundred steps of the latter; that is to say in each revolution the ring 31 gains one step on the dial 25, so that after one complete revolution of the latter the pointer 62, which started at 0 on the dial 25, will indicate 1 on said dial. In the gearing which is interposed between the shaft 24 and the dial 34 we find a pinion 32 carried by the ring dial 31 and meshing into the two gears 30 and 33 to which latter is attached the dial 34 in such manner that said dial in its rotation loses one point in each revolution as compared with the pointer-carrying dial 31, so that starting at 0, said dial 34 will after an entire revolution of the dial 31 stand with its first graduation opposite the pointer 62. Thus the outer dial 25 indicates units to the pointer 61 and hundreds to the pointer 62, and the dial 34 read by means of the pointer 62 indicates tens of thousands. The arrangement just described permits the total amount registered to be easily read; for instance, the dials at Fig. 3 indicate $5,450. At any given time when the register is examined these dials will give the amount in dollars, and the units indicating mechanism on the outside the cents, since the register should not be turned back to zero until just before it is to be operated to register a sale.

I claim—

1. In a cash register, the combination with the main shaft, of a dial rigidly fastened thereon, a pointer loosely pivoted upon said shaft provided with a crank or handle and having means for operative connection with the dial for turning the latter in either direction, and a registering train actuated by the main shaft, substantially as described.

2. In a cash register, the combination with the main shaft having a ratchet wheel of one hundred teeth loosely mounted thereon, of a dial plate rigidly fastened on said shaft and having a pawl adapted to engage the ratchet wheel to carry the latter in one direction, the pointer pivoted on the main shaft and adapted to move over the face of the dial, means as described for coupling the dial and pointer together, and a spring-actuated locking pawl adapted to engage and to hold said pointer, substantially as set forth.

3. In a cash register, the combination with the main shaft having loosely mounted thereon the one hundred toothed ratchet wheel, of the dial rigidly fastened on said main shaft and having a pawl adapted for engagement with the ratchet wheel to carry the latter in one direction, the centrally pivoted pointer co-operating with the dial to form the primary indicating device, a secondary indicating device as described, actuated from the main shaft, worm gear borne upon said main shaft, and a totalizing registering train engaged and operated by said worm gear, substantially as shown and for the purpose described.

4. In a cash register, the combination with the main shaft and the one hundred toothed ratchet wheel loosely mounted thereon, of the dial rigidly mounted on said shaft and bearing a pawl adapted to make connection with the ratchet wheel to move the same in one direction, the pointer and means for connecting it with the dial so as to operate the latter in both directions, the totalizing mechanism substantially as described and which is actuated from the main shaft, the supplemental shaft and its indicating disk, and connections substantially as set forth for the operation of the supplemental shaft one step at each complete turn of the main shaft, all arranged and adapted to operate as described.

5. In a cash register, the combination with the main shaft, its dial, and means for operating it, of the supplemental shaft having an indicating disk, a ratchet wheel upon said shaft, an arm provided with an actuating pawl carried by the main shaft and adapted to actuate the ratchet wheel one step at each complete revolution of the main shaft, suitable retaining pawl co-operating with the ratchet wheel, and a spring connected to and adapted to return said supplemental shaft, substantially as described.

6. In a machine of the character described, the combination with the main shaft, of the dial and pointer adapted to actuate said shaft, the supplemental shaft and its dial, a pair of arms mounted upon said main shaft and adapted, the one to operate the supplemental shaft, and the other to disengage the drawer-latch, the spring engaging and adapted to return the supplemental shaft, and a trip mounted upon the arm 42 and adapted to release said shaft, substantially as described.

7. In a machine of the character described, the main shaft and worm gear, in combination with the gears 20 and 21, the dials 25 and 34, the pointer-carrying ring 31, and the intermediate gears arranged and operating as described whereby the appropriate movement is imparted to the several dials, substantially as and for the purpose specified.

8. In a machine of the character described, the main shaft and the worm gear carried thereby, in combination with the transverse shaft 22, the gear 21 secured upon said shaft, the gear 20 and its dial loosely mounted upon said shaft, the ring dial 31 and an operative connection between said dial and a pinion borne on the gear 20, the dial 34, pinion 32 borne by the ring dial 31, and a driving connection between said pinion and the dial 34, the whole arranged and adapted to operate as and for the purposes hereinbefore set forth.

9. As a totalizing device for machines of the character described, the gears 20 and 21 and means as a worm gear for actuating them, in combination with dials 25 and 34, the pointer carrying ring 31, and the intermittent gears combined and arranged and operating as described whereby the appropriate movement is imparted to the several dials, substantially as and for the purpose specified.

In testimony whereof I affix my signature in presence of two witnesses.

JOSEPH H. GREENLEAF.

Witnesses:
S. H. HUBBARD,
A. J. TANNER.